United States Patent
Durocher et al.

(10) Patent No.: US 11,041,443 B2
(45) Date of Patent: *Jun. 22, 2021

(54) MULTI-SPOOL GAS TURBINE ENGINE ARCHITECTURE

(71) Applicant: PRATT & WHITNEY CANADA CORP., Longueuil (CA)

(72) Inventors: Eric Durocher, Vercheres (CA); Keith Morgan, Westmount (CA); Lazar Mitrovic, Longueuil (CA); Jean Dubreuil, Boucherville (CA); Martin Poulin, Mont Saint-Hilaire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/583,896

(22) Filed: Sep. 26, 2019

(65) Prior Publication Data
US 2020/0095942 A1    Mar. 26, 2020

Related U.S. Application Data

(63) Continuation of application No. 15/351,818, filed on Nov. 15, 2016, now Pat. No. 10,465,611, which is a
(Continued)

(51) Int. Cl.
*F02C 7/32*     (2006.01)
*F02C 6/20*     (2006.01)
(Continued)

(52) U.S. Cl.
CPC .................. *F02C 7/32* (2013.01); *F02C 3/10* (2013.01); *F02C 3/145* (2013.01); *F02C 6/206* (2013.01); *Y02T 50/60* (2013.01)

(58) Field of Classification Search
CPC ...... F02C 7/36; F02C 3/04; F02C 3/09; F02C 3/10; F02C 3/145; F02C 7/32; F02K 3/06; F02K 3/025
See application file for complete search history.

(56) References Cited

U.S. PATENT DOCUMENTS 2,548,975 A    4/1951    Hawthorne
2,737,018 A    3/1956    Bain
(Continued)

FOREIGN PATENT DOCUMENTS

CA    2562290    10/2013
CA    2970386    1/2018
(Continued)

OTHER PUBLICATIONS

A New Approach to Turboshot Engine Growth, M.A. Compagnon, GEG, Lynn, MA, pp. 80-41-1 to 80-41-6, May 13, 1980.
(Continued)

*Primary Examiner* — Ehud Gartenberg
*Assistant Examiner* — Henry Ng
(74) *Attorney, Agent, or Firm* — Norton Rose Fulbright Canada LLP

(57) ABSTRACT

A multi-spool gas turbine engine comprises a low pressure (LP) spool and a high pressure (HP) spool independently rotatable about a central axis extending through an accessory gear box (AGB). The LP spool has an LP compressor, which is axially positioned between the HP compressor of the HP spool and the AGB. A tower shaft drivingly connects the HP spool to the AGB.

29 Claims, 3 Drawing Sheets

Related U.S. Application Data continuation-in-part of application No. 15/266,321, filed on Sep. 15, 2016.

(51) Int. Cl.
*F02C 3/10* (2006.01)
*F02C 3/14* (2006.01)

(56) References Cited

U.S. PATENT DOCUMENTS

| | | |
|---|---|---|
| 2,747,367 A | 5/1956 | Savin |
| 2,929,207 A | 3/1960 | Petersen |
| 2,955,424 A | 11/1960 | Hrynisak |
| 2,984,977 A | 5/1961 | Embrer |
| 3,152,443 A | 10/1964 | Newland |
| 3,170,292 A | 2/1965 | Howes |
| 3,204,406 A | 9/1965 | Howes |
| 3,209,536 A | 10/1965 | Howes et al. |
| 3,255,825 A | 6/1966 | Moville et al. |
| 3,488,947 A | 1/1970 | Muller et al. |
| 3,529,419 A | 9/1970 | Reed |
| 3,762,161 A | 10/1973 | Pennig |
| 3,874,811 A | 4/1975 | Dennison |
| 4,055,949 A | 11/1977 | Boudigues |
| 4,141,212 A | 2/1979 | Koschier |
| 4,251,987 A | 2/1981 | Adamson |
| 4,449,829 A | 5/1984 | Ikemoto et al. |
| 4,531,694 A | 7/1985 | Soloy |
| 4,611,464 A | 9/1986 | Hetzer et al. |
| 4,685,286 A | 8/1987 | Hetzer et al. |
| 4,817,382 A | 4/1989 | Rudolph et al. |
| 4,864,812 A | 9/1989 | Rodgers |
| 5,159,808 A | 11/1992 | Kast |
| 5,161,364 A | 11/1992 | Bruen |
| 5,309,708 A | 5/1994 | Stewart |
| 6,041,589 A | 3/2000 | Giffin, III et al. |
| 6,082,967 A | 7/2000 | Loisy |
| 6,247,668 B1 | 6/2001 | Reysa |
| 6,855,089 B2 | 2/2005 | Poulin |
| 6,865,891 B2 | 3/2005 | Walsh et al. |
| 6,895,741 B2 | 5/2005 | Rago et al. |
| 7,055,303 B2 | 6/2006 | Macfarlane et al. |
| 7,168,913 B2 | 1/2007 | Lardellier |
| 7,500,365 B2 | 3/2009 | Suciu et al. |
| 7,552,591 B2 | 6/2009 | Bart et al. |
| 7,690,185 B2 | 4/2010 | Linet et al. |
| 7,707,909 B2 | 5/2010 | Linet et al. |
| 7,762,084 B2 | 7/2010 | Martis |
| 8,176,725 B2 | 5/2012 | Norris et al. |
| 8,209,952 B2 | 7/2012 | Ress, Jr. |
| 8,459,038 B1 | 6/2013 | Lickfold et al. |
| 8,516,789 B2 | 8/2013 | Kupratis |
| 8,568,089 B2 | 10/2013 | Lemmers, Jr. et al. |
| 8,621,871 B2 | 1/2014 | McCune et al. |
| 8,794,922 B2 | 8/2014 | Bart et al. |
| 8,853,878 B1 | 10/2014 | White |
| 9,062,611 B2 | 6/2015 | Sheridan |
| 9,126,691 B2 | 9/2015 | Cloft |
| 9,145,834 B2 | 9/2015 | Frost et al. |
| 9,239,004 B2 | 1/2016 | Kupratis |
| 9,322,341 B2 | 4/2016 | Belleville |
| 9,328,667 B2 | 5/2016 | MacFarlane |
| 9,341,121 B2 | 5/2016 | Kupratis |
| 9,353,848 B2 | 5/2016 | Blewett et al. |
| 9,512,784 B2 | 12/2016 | Morgan et al. |
| 9,719,465 B2 | 8/2017 | Suciu |
| 9,745,860 B1 | 8/2017 | Haskin |
| 9,752,500 B2 | 9/2017 | Ullyott et al. |
| 9,784,182 B2 | 10/2017 | Ohanuke |
| 9,819,292 B2 | 11/2017 | Thacher |
| 9,828,911 B2 | 11/2017 | Burghardt |
| 9,890,704 B2 | 2/2018 | Speak et al. |
| 9,926,849 B2 | 3/2018 | Frost et al. |
| 9,932,858 B2 | 4/2018 | Miler |
| 10,054,001 B2 | 8/2018 | Beutin et al. |
| 10,072,570 B2 | 9/2018 | Kupratis |
| 10,082,080 B2 | 9/2018 | Vessot et al. |
| 10,087,761 B2 | 10/2018 | Calvert et al. |
| 10,094,295 B2 | 10/2018 | Ullyott et al. |
| 10,113,482 B2 | 10/2018 | Poulin |
| 10,125,722 B2 | 11/2018 | Kupratis |
| 2005/0221946 A1 | 10/2005 | Mitrovic |
| 2006/0010152 A1 | 1/2006 | Catalano |
| 2006/0137355 A1 | 6/2006 | Welch et al. |
| 2007/0240427 A1 | 10/2007 | Ullyot |
| 2008/0081733 A1 | 4/2008 | Hattenbach |
| 2008/0138195 A1 | 6/2008 | Kern |
| 2008/0148881 A1 | 6/2008 | Moniz et al. |
| 2009/0015011 A1 | 1/2009 | Colin |
| 2009/0288421 A1 | 11/2009 | Zeiner |
| 2009/0322088 A1 | 12/2009 | Dooley |
| 2010/0164234 A1 | 7/2010 | Bowhan |
| 2010/0180568 A1 | 7/2010 | Sachs |
| 2010/0212285 A1 | 8/2010 | Negulescu |
| 2010/0281875 A1 | 11/2010 | Price |
| 2011/0056208 A1 | 3/2011 | Norris |
| 2011/0171030 A1 | 7/2011 | Swift |
| 2011/0284328 A1 | 11/2011 | Brendt |
| 2013/0031912 A1 | 2/2013 | Finney |
| 2013/0056982 A1 | 3/2013 | Gozdawa |
| 2013/0098066 A1 | 4/2013 | Gullet |
| 2013/0139518 A1 | 6/2013 | Moyen |
| 2013/0145769 A1 | 6/2013 | Norris |
| 2013/0146058 A1 | 7/2013 | Sheridan |
| 2013/0255224 A1 | 10/2013 | Kupratis |
| 2014/0069107 A1 | 3/2014 | Macfarlane |
| 2014/0130352 A1 | 5/2014 | Buldtmann et al. |
| 2014/0150401 A1 | 6/2014 | Venter |
| 2014/0252160 A1 | 9/2014 | Suciu et al. |
| 2014/0255147 A1 | 9/2014 | Rust |
| 2014/0256494 A1 | 9/2014 | Lewis |
| 2014/0256862 A1 | 9/2014 | Suciu et al. |
| 2014/0260295 A1 | 9/2014 | Ullyott et al. |
| 2014/0290265 A1 | 10/2014 | Ullyott |
| 2014/0297155 A1 | 10/2014 | Chen |
| 2015/0013307 A1 | 1/2015 | Burghardt |
| 2015/0167549 A1 | 6/2015 | Riberon |
| 2015/0337738 A1 | 11/2015 | Suciu |
| 2015/0369123 A1 | 12/2015 | Hanrahan |
| 2015/0377125 A1 | 12/2015 | Kupratis |
| 2016/0040601 A1 | 2/2016 | Frost et al. |
| 2016/0090871 A1 | 3/2016 | Olsen |
| 2016/0169118 A1 | 6/2016 | Duong |
| 2016/0201490 A1 | 7/2016 | Scott |
| 2016/0208690 A1 | 7/2016 | Zimmitti |
| 2016/0215694 A1 | 7/2016 | Brostmeyer |
| 2016/0230843 A1 | 8/2016 | Duong et al. |
| 2016/0245185 A1 | 8/2016 | Lamarre et al. |
| 2016/0290266 A1 | 10/2016 | Miyamoto et al. |
| 2016/0305261 A1 | 10/2016 | Orosa |
| 2016/0319845 A1 | 11/2016 | Molnar |
| 2016/0333791 A1 | 11/2016 | Snyder et al. |
| 2016/0341214 A1 | 11/2016 | O'Toole |
| 2017/0108084 A1 | 4/2017 | Chmylkowski |
| 2017/0122122 A1 | 5/2017 | Lepretre |
| 2017/0191413 A1 | 7/2017 | Kript |
| 2017/0211477 A1 | 7/2017 | Molnar |
| 2017/0211484 A1 | 7/2017 | Sheridan |
| 2017/0306841 A1 | 10/2017 | Skertic |
| 2017/0327241 A1 | 11/2017 | Mitrovic |
| 2017/0356347 A1 | 12/2017 | Scothern |
| 2017/0356452 A1 | 12/2017 | Mastro |
| 2017/0370284 A1 | 12/2017 | Harvey |
| 2018/0016698 A1 | 1/2018 | Abe |
| 2018/0023480 A1 | 1/2018 | Lefebvre |
| 2018/0023481 A1 | 1/2018 | Lefebvre |
| 2018/0023482 A1 | 1/2018 | Lefebvre |
| 2018/0026642 A1 | 1/2018 | Jeppesen |
| 2018/0045068 A1 | 2/2018 | Brinson et al. |
| 2018/0045119 A1 | 2/2018 | Sheridan et al. |
| 2018/0058330 A1 | 3/2018 | Munera |
| 2018/0073428 A1 | 3/2018 | Morgan |
| 2018/0073438 A1 | 3/2018 | Durocher et al. |
| 2018/0135522 A1 | 5/2018 | Mitrovic et al. |

(56) References Cited

U.S. PATENT DOCUMENTS

| | | |
|---|---|---|
| 2018/0149091 A1 | 5/2018 | Howell et al. |
| 2018/0163640 A1 | 6/2018 | Dubreuil et al. |
| 2018/0163845 A1 | 6/2018 | van der Merwe et al. |
| 2018/0171815 A1 | 6/2018 | Suciu et al. |
| 2018/0172012 A1 | 6/2018 | Plante et al. |
| 2018/0202310 A1 | 7/2018 | Suciu et al. |
| 2018/0202366 A1 | 7/2018 | Suciu et al. |
| 2018/0202367 A1 | 7/2018 | Suciu et al. |
| 2018/0202368 A1 | 7/2018 | Suciu et al. |
| 2018/0208322 A1 | 7/2018 | Tantot |
| 2018/0216525 A1 | 8/2018 | Plante et al. |
| 2018/0223739 A1 | 8/2018 | Dubreuil et al. |
| 2018/0283218 A1 | 10/2018 | Slayter et al. |
| 2018/0283281 A1 | 10/2018 | Veilleux, Jr. et al. |
| 2018/0291817 A1 | 10/2018 | Suciu et al. |
| 2018/0304753 A1 | 10/2018 | Vondrell et al. |
| 2018/0305036 A1 | 10/2018 | Vondrell et al. |
| 2018/0313274 A1 | 11/2018 | Suciu et al. |
| 2018/0334964 A1 | 11/2018 | Desjardins et al. |
| 2018/0347471 A1 | 12/2018 | Wotzak |

FOREIGN PATENT DOCUMENTS

| | | |
|---|---|---|
| CA | 2970389 | 1/2018 |
| CA | 295558 | 6/2018 |
| CN | 108661807 | 12/2018 |
| EP | 0103370 | 3/1984 |
| EP | 0860593 | 9/2003 |
| EP | 2226487 | 9/2010 |
| EP | 2295763 | 3/2011 |
| EP | 2320067 | 5/2011 |
| EP | 1959114 | 5/2012 |
| EP | 2728140 | 5/2014 |
| EP | 3043056 | 7/2016 |
| EP | 2935839 | 12/2017 |
| EP | 3273031 | 1/2018 |
| EP | 3273032 | 4/2018 |
| EP | 3273034 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 10/1952 |
| GB | 1102591 | 2/1968 |
| WO | 9502120 | 1/1995 |
| WO | 2005061873 | 7/2005 |
| WO | 2008045068 | 4/2008 |
| WO | 2015033336 | 3/2015 |
| WO | 2015122948 | 8/2015 |
| WO | 2017198999 | 11/2017 |
| WO | 2018087478 | 5/2018 |

OTHER PUBLICATIONS

European Search Report dated Nov. 30, 2017 in counterpart EP Application 17182102.8.
European Search Report dated Dec. 12, 2017 in related EP Application 17182096.2.
European Search Report dated Dec. 15, 2017 in related EP Application 17182076.4.
European Search Report dated Jan. 31, 2018 in related EP Application 17185796.4.
European Search Report dated Mar. 19, 2018 in related EP Application 17182087.1.
European Search Report dated Mar. 21, 2018 in related EP Application 17182094.7.
European Search Report dated Apr. 6, 2018 in related EP Application17193893.9.
European Search Report dated May 25, 2018 in related EP Application 17186249.3.
European Search Report in related EP Application 18154161.6.
European Search report issued in counterpart application No. 20151777.8 dated Oct. 14, 2020.

//MULTI-SPOOL GAS TURBINE ENGINE ARCHITECTURE

CROSS-REFERENCE TO RELATED APPLICATIONS

This application is a continuation of U.S. application Ser. No. 15/351,818 filed Nov. 15, 2016 which claims priority from U.S. application Ser. No. 15/266,321 filed Sep. 15, 2016, the entire contents of which are incorporated by reference herein.

TECHNICAL FIELD

The application relates generally to gas turbine engines and, more particularly, to multi-spool gas turbine engines.

BACKGROUND OF THE ART

Gas turbine engines, particularly those which power aircraft, are often provided with accessories such as electrical generators, pumps and the like, which are required for operation of the engine and an associated aircraft. It is common practice to mechanically connect such accessories to the engine by means of an accessory gearbox which is itself mechanically connected to the rotational shaft of the engine and externally mounted to the engine casing in offset relationship with the engine centerline. It will be readily appreciated that the ease in which the accessories and the gearbox may be removed for repair and maintenance is largely a function of the manner in which the accessories and the gearbox are mounted on the engine which is determinative of the free space surrounding the accessories and gearbox available for the removal and reinstallation thereof for maintenance and servicing.

SUMMARY

In one aspect, there is provided a multi-spool gas turbine engine comprising: a low pressure (LP) spool and a high pressure (HP) spool rotatable independently of one another about a central axis, the LP spool having an LP compressor and an LP turbine, the HP spool having an HP turbine and an HP compressor; the engine further comprising an accessory gear box (AGB) and a tower shaft drivingly connecting the AGB to the HP spool, the AGB is disposed on the engine so that the central axis extends through the AGB, wherein the LP compressor is axially positioned between the HP compressor and the AGB.

In another aspect, there is provided a reverse flow gas turbine engine comprising: an output drive shaft having a front end configurable to drivingly engage a rotatable load; a low pressure (LP) spool rotatable about an engine axis and including an LP turbine drivingly engaged to the output drive shaft, and an LP compressor drivingly connected to the LP turbine, the LP turbine disposed forward of the LP compressor relative to a front end of the output drive shaft; and a high pressure (HP) spool rotatable about the engine axis independently of the LP spool, the HP spool including an HP turbine and an HP compressor drivingly engaged to an HP shaft, the HP compressor disposed forward of the LP compressor and in fluid communication therewith, and the HP turbine disposed aft of the LP turbine and in fluid communication therewith; a tower shaft mechanically coupled to the high pressure spool; an accessory gearbox (AGB) disposed aft of the LP compressor, the engine axis extending through the AGB; and an AGB drive shaft having a first end mechanically coupled to the tower shaft and a second end mechanically coupled to the AGB.

In yet another aspect, there is provided a multi-spool gas turbine engine comprising: a low pressure (LP) spool; a high pressure (HP) spool, the LP spool and the HP spool being independently rotatable about a central axis, the LP pressure spool comprising an LP compressor and an LP turbine, the HP spool comprising an HP turbine and an HP compressor; and an accessory gear box (AGB), the central axis extending through the AGB and the LP compressor being axially positioned between the HP compressor and the AGB, the AGB comprising first and second gear trains, the first gear train having a first drive input, the second gear drain having a second drive input, the first and second drive inputs being respectively drivingly connected to the HP and LP spools.

In a still further general aspect, there is provided a multi-spool gas turbine engine comprising: a low pressure (LP) spool; a high pressure (HP) spool, the LP spool and the HP spool being independently rotatable about a central axis, the LP pressure spool comprising an LP compressor and an LP turbine, the HP spool comprising an HP turbine and an HP compressor; an accessory gear box (AGB), the central axis extending through the AGB and the LP compressor being axially positioned between the HP compressor and the AGB; and at least one accessory drivingly connected to the AGB, the at least one accessory being mounted on a side of the AGB and having an input axis oriented transversally with respect to the central axis.

DESCRIPTION OF THE DRAWINGS

Reference is now made to the accompanying figures in which.

DETAILED DESCRIPTION

Figure 1:
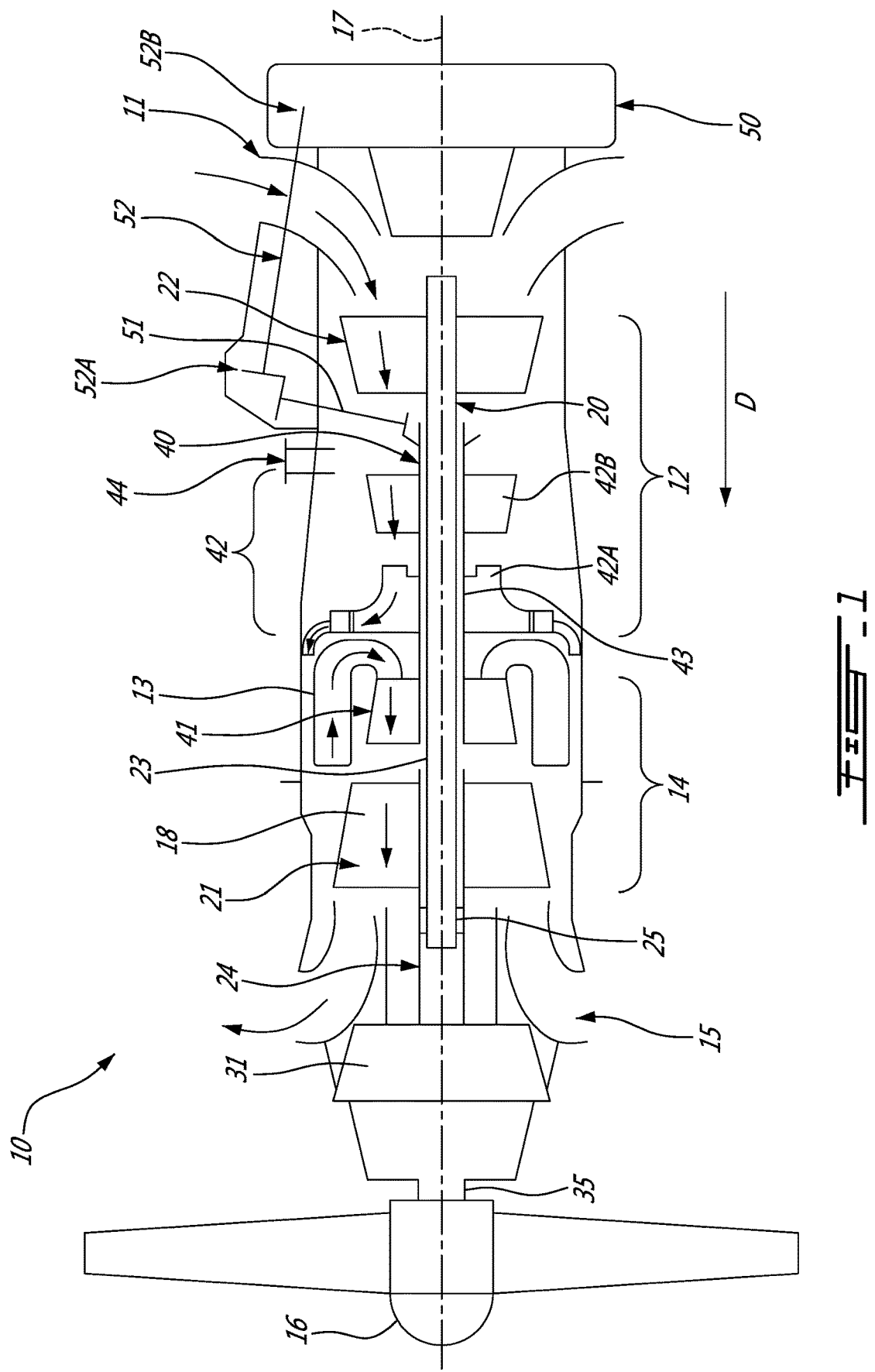
FIG. 1 is a schematic cross-sectional view of a gas turbine engine, according to an embodiment of the present disclosure.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The engine 10 includes a propeller 16 which provides thrust for flight and taxiing. The gas turbine engine 10 has a longitudinal center axis 17.

The gas turbine engine 10 (sometimes referred to herein simply as "engine 10") has a central core 18 defining a gas path through which gases flow as depicted by flow arrows in FIG. 1. The exemplified engine 10 is a "reverse-flow" engine 10 because gases flow through the core 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from a rear end thereof towards the propeller 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

Still referring to FIG. 1, the engine 10 has multiple spools which perform compression to pressurize the air received through the air inlet 11, and which extract energy from the combustion gases before they exit the core 18 via the exhaust outlet 15. According to the illustrated example, the engine 10 is provided in the form of a multi-spool engine having a low pressure (LP) spool 20 and a high pressure (HP) spool 40 independently rotatable about axis 17. However, it is understood that a multi-spool engine could have more than two spools.

The LP spool 20 includes at least one component to compress the air that is part of the compressor section 12, and at least one component to extract energy from the combustion gases that is part of the turbine section 14. More particularly, the LP spool 20 has a low pressure turbine 21 which extracts energy from the combustion gases, and which is drivingly engaged (e.g. directly connected) to an LP compressor 22 for pressurizing the air. The LP turbine 21 (also referred to as the power turbine) drives the LP compressor 22, thereby causing the LP compressor 22 to pressurize the air. Both the LP turbine 21 and the LP compressor 22 are disposed along the axis 17. In the depicted embodiment, both the LP turbine 21 and the LP compressor 22 are axial rotatable components having an axis of rotation that is coaxial with the center axis 17. They can include one or more stages, depending upon the desired engine thermodynamic cycle, for example.

In the depicted embodiment, the LP spool 20 has a power shaft 23 which mechanically couples the LP turbine 21 and the LP compressor 22, and extends axially between them. The shaft 23 is coaxial with the central axis 17 of the engine 10. The shaft 23 allows the LP turbine 21 to drive the LP compressor 22 during operation of the engine 10. The shaft 23 is not limited to the configuration depicted in FIG. 1, and can also mechanically couple the LP turbine 21 and the LP compressor 22 in any other suitable way provided that it transmits a rotational drive from the LP turbine 21 to the LP compressor 22. For example, the shaft 23 can be combined with a geared LP compressor 22 to allow the LP compressor 22 to run at a different rotational speed from the LP turbine 21. This can provide more flexibility in the selection of design points for the LP compressor 22.

The LP turbine 21 is forward of the LP compressor 22. The LP turbine 21 is also aft of the exhaust outlet 15. The LP compressor 22 is forward of the air inlet 11. This arrangement of the LP turbine 21 and the LP compressor 22 provides for a reverse-flow engine 10 that has one or more LP compressors located at the rear of the engine 10, which are driven by one or more LP turbines located at the front of the engine 10.

Still referring to FIG. 1, the engine 10 includes an output drive shaft 24. The drive shaft 24 extends forwardly from the LP turbine 21 and is drivingly engaged thereto. In the illustrated example, the drive shaft 24 is distinct from the power shaft 23 and mechanically coupled thereto to be driven by the LP turbine 21. In the depicted embodiment, the drive shaft 24 and the power shaft 23 are coaxial and interconnected. FIG. 1 shows that the power and drive shafts 23, 24 are interconnected with a spline 25. The spline 25, which can include ridges or teeth on the drive shaft 24 that mesh with grooves in the power shaft 23 (or vice versa), allows for the transfer of torque between the drive shaft 24 and the power shaft 23. In the depicted embodiment, the power shaft 23 lies at least partially within the drive shaft 24, such that the spline 25 transfers the rotational drive or torque generated by the LP turbine 21 from the drive shaft 24 to the power shaft 23. The spline 25 can operate so that the power shaft 23 and the drive shaft 24 rotate at the same rotational speed. Other mechanical techniques can also be used to interconnect the power and drive shafts 23, 24. For example, the power and drive shafts 23, 24 can be interconnected by curvic coupling, pins, and interference fits. Other configurations of the drive shaft 24 and the power shaft 23 are also possible. For example, the drive shaft 24 and the power shaft 23 can be a single shaft driven by the LP turbine 21. The drive shaft 24 therefore transfers the rotational output of the LP turbine 21 in a forward direction to drive another component.

A rotatable load, which in the embodiment shown includes the propeller 16, is mountable to the engine 10, and when mounted, is drivingly engaged (e.g. directly connected) to the LP turbine 21, and is located forward of the LP turbine 21. In such a configuration, during operation of the engine 10, the LP turbine 21 drives the rotatable load such that a rotational drive produced by the LP turbine 21 is transferred to the rotatable load. The rotatable load can therefore be any suitable component, or any combination of suitable components, that is capable of receiving the rotational drive from the LP turbine 21, as now described.

In the embodiment shown, a reduction gearbox 31 (sometimes referred to herein simply as "RGB 31") is mechanically coupled to a front end of the drive shaft 24, which extends between the RGB 31 and the LP turbine 21. The RGB 31 processes and outputs the rotational drive transferred thereto from the LP turbine 21 via the drive shaft 24 through known gear reduction techniques. The RGB 31 allows for the propeller 16 to be driven at its optimal rotational speed, which is different from the rotational speed of the LP turbine 21.

The propeller 16 is mechanically coupled to the output of the RGB 31 via a propeller shaft 35. The propeller shaft 35 allows the rotational drive outputted by the RGB 31 during operation of the engine 10 to be transferred to the propeller 16 to provide propulsion during flight. In an alternate embodiment where the engine 10 is a turboshaft, the propeller 16 is omitted and the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31, or the propeller 16 and RGB 31 are omitted such that the output of the engine 10 is provided by the output drive shaft 24.

The drive shaft 24 extending forward of the LP turbine 21 and the power shaft 23 extending aft of the LP turbine 21 provide the engine 10 with bidirectional drive. Modularity criteria for gas turbine engines may require the use of distinct shafts 23, 24 that are directly or indirectly connected together. Alternately, the power shaft 23 and the drive shaft 24 can be integral with one another, with a first segment of the integral output shaft extending between the LP compressor 22 and the LP turbine 21, and a second segment extending between the rotatable load and the LP turbine 21. Whether the power shaft 23 is integral with the drive shaft 24 or distinct therefrom, the LP turbine 21 provides rotational drive outputted at each end of the power shaft 23.

In light of the preceding, it can be appreciated that the LP turbine 21 drives both the rotatable load and the LP compressor 22. Furthermore, the rotatable load, when mounted to the engine 10 and the LP compressor 22 are disposed axially on opposite ends of the LP turbine 21. It can thus be appreciated that one or more low pressure turbines are used to drive elements in front of the low pressure turbines (e.g. propeller 16, RGB 31, etc.) as well as to drive elements to the rear of the low pressure turbines (e.g. LP compressor 22). This configuration of the LP turbine 21 allows it to simultaneously drive the rotatable load and the LP compressor 22, if desired. As will be discussed in greater detail below, this arrangement of the rotatable load, the LP turbine 21, and the LP compressor 22 can contribute to improving the thermodynamic efficiency of the engine 10.

Still referring to FIG. 1, the HP spool 40 with at least one component to compress the air that is part of the compressor section 12, and at least one component to extract energy from the combustion gases that is part of the turbine section 14. The HP spool 40 is also disposed along the axis 17 and includes an HP turbine 41 drivingly engaged (e.g. directly connected) to a high pressure compressor 42 by an HP shaft 43 rotating independently of the power shaft 23. Similarly to the LP turbine 21 and the LP compressor 22, the HP turbine 41 and the HP compressor 42 can include various stages of axial rotary components. In the depicted embodiment, the HP compressor 42 includes a centrifugal compressor 42A or impeller and an axial compressor 42B, both of which are driven by the HP turbine 41. During operation of the engine 10, the HP turbine 41 drives the HP compressor 42.

The HP turbine 41 is aft of the LP turbine 21, and forward of the combustor 13. The HP compressor 42 is aft of the combustor 13, and forward of the LP compressor 22. From this arrangement of the HP turbine 41 and the HP compressor 42, it can be appreciated that during operation of the engine 10, the LP compressor 22 driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine when compared to the HP turbine 41. The LP turbine 21 is sometimes referred to as a "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22. The engine 10 shown in FIG. 1 is thus a "two-spool" engine 10.

The HP turbine 41 and the HP compressor 42 can have any suitable mechanical arrangement to achieve the above-described split compressor functionality. For example, and as shown in FIG. 1, the HP spool 40 includes a high pressure shaft 43 extending between the HP compressor 42 and the HP turbine section 41. The high pressure shaft 43 is coaxial with the power shaft 23 and rotatable relative thereto. The relative rotation between the high pressure shaft 43 and the power shaft 23 allow the shafts 23, 43 to rotate at different rotational speeds, thereby allowing the HP compressor 42 and the LP compressor 22 to rotate at different rotational speeds. The HP shaft 43 can be mechanically supported by the power shaft 23 using bearings or the like. In the depicted embodiment, the power shaft 23 is at least partially disposed within the HP shaft 43.

The split compressor arrangement also allows bleed air to be drawn from between the HP compressor 42 and the LP compressor 22. More particularly, in the embodiment of FIG. 1, the engine 10 includes an inter-stage bleed 44 port or valve that is aft of the HP compressor 42 and forward of the LP compressor 22, which may provide for increased flexibility in the available bleed pressures. In a particular embodiment, the bleed pressure design point of the inter-stage bleed 44 is selected based on the pressure ratio of the LP compressor 22, which runs independently from the HP compressor 42. For operability, variable inlet guide vanes (VIGV) and variable guide vanes (VGV) can be used on the LP compressor 22 and at the entry of the HP compressor 42, together with the inter-stage bleed 44.

Still referring to the embodiment shown in FIG. 1, the engine 10 also includes an accessory gearbox (AGB) 50. The AGB 50 receives a rotational output and in turn drives accessories (e.g. fuel pump, starter-generator, oil pump, scavenge pump, etc.) that contribute to the functionality of the engine 10.

The AGB 50 is axially aft of the air inlet 11. More particularly, in the illustrated embodiment, the AGB 50 is mounted centrally relative to the engine axis 17 at the rear end of the engine 10. As can be best appreciated from FIG. 2, by axially mounting the AGB 50 in series with the LP and HP spools 20 and 40 instead of side-mounting the AGB, the AGB 50 may be substantially accommodated with the engine envelope as schematically represented by circle C in FIG. 2. In this way, the engine 10 can be packaged as "straighter cylinder" engine, which may be advantageous in some installations. The in-line or axial mounting of the AGB instead of conventional side-mounting configuration allows minimizing the diameter of the engine envelope. It also allows to simplify the design of the AGB (cost, weight) compared to conventional side-mounted AGBs.

It is understood that the in-line mounting of the AGB 50 is not strictly limited to a coaxial or centralized mounting of the AGB 50 as shown in FIG. 1. For instance, the engine axis 17 could extend through the AGB 50 but be offset from the center thereof. The AGB 50 would nevertheless be located axially aft of the LP compressor 22 and the air inlet 11 along the axis 17 and be mounted to an axially facing surface of the engine.

According to the illustrated embodiment, the AGB is drivingly connected to the HP spool 40. To get around the LP compressor 22, which is physically disposed between the HP compressor and the AGB, an HP offset drive may be used. The HP offset drive may include a tower shaft 51 that is mechanically coupled to a rear of the HP shaft 43 and driven thereby. The tower shaft extends from the HP spool 40 in a direction away from the engine axis 17 for connection with an accessory gear box drive shaft 52 having a first geared end 52A mechanically coupled to the tower shaft 51, and a second geared end 52B mechanically coupled to the AGB 50. As can be appreciated from FIG. 1, the AGB drive shaft 52 has a main axial component parallel to the engine axis 17 to bridging the tower shaft to the AGB 50.

In the depicted embodiment, the accessory gearbox drive shaft 52 extends across the air inlet 11. This configuration of the accessory gearbox drive shaft 52 can take different forms. For example, it can be located outside the air inlet 11, or may be placed within the air inlet 11 along a strut of the air inlet 11. It can thus be appreciated that the second end 52B of the accessory gearbox drive shaft 52 meshes with an input gear of the AGB 50 to drive the AGB 50 across the air inlet 11.

Figure 2:
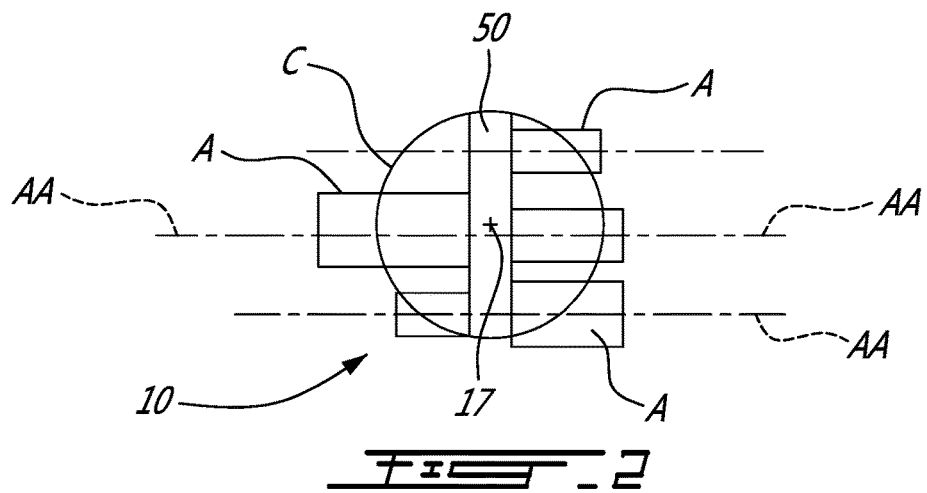
FIG. 2 is a schematic rear end view of the engine shown in FIG. 1 illustrating accessories side-mounted to an axially mounted accessory gearbox (AGB) of the engine.

During operation of the engine 10, the high pressure shaft 43 transmits a rotational drive to the tower shaft 51, which, in turn, drives the accessory gearbox drive shaft 52 to thereby drive the accessories A (FIG. 2) connected to the AGB outputs. As shown in FIG. 2, the accessories A are mounted on opposed lateral sides of the AGB 50 with their respective input axes AA transversal to the engine axis 17. The side-mounting of the accessories A on the in-line mounted AGB 50 facilitates access to the accessories A during on-wing maintenance operations. It also contributes to reduce the engine overall length. It may also simplify cooling line routing for some accessories, such as the starter and the generator (accessories closer to engine cowling).

Figure 3:
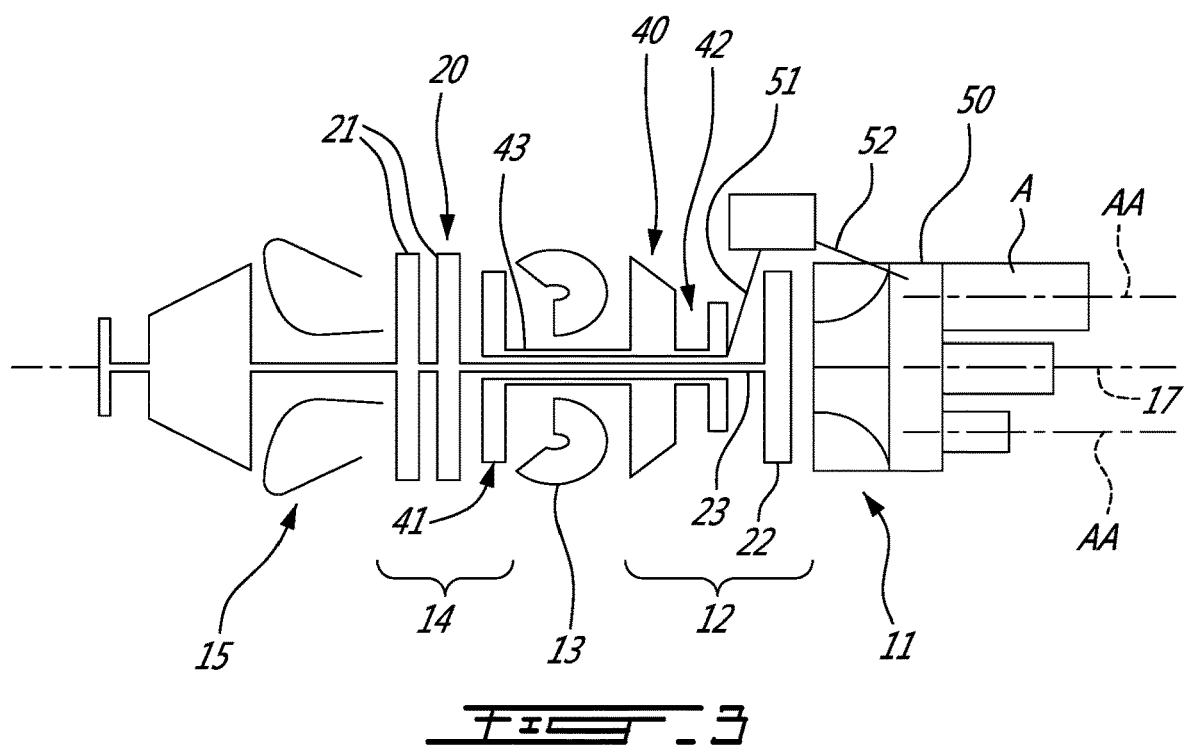
FIG. 3 is a schematic cross-sectional view of the gas turbine engine but this time with axially mounted accessories.
Figure 4:
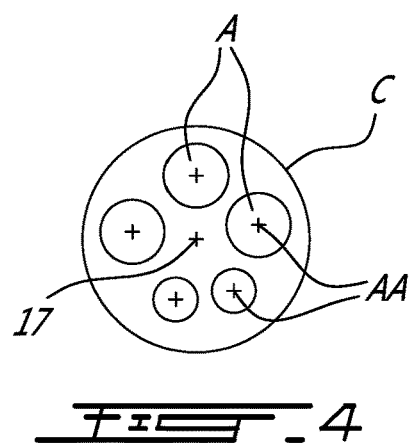
FIG. 4 is a schematic rear end view of the engine shown in FIG. 3 and illustrating the accessories projecting axially from a rear axially facing face of the AGB.

As shown in FIGS. 3 and 4, the accessories A could also be mounted on the rear axially facing side of the AGB 50 with respective input axes of the accessories extending parallel to the engine axis 17. Such an in-line mounting of the AGB and the accessories may be suitable in some applications.

Figure 5:
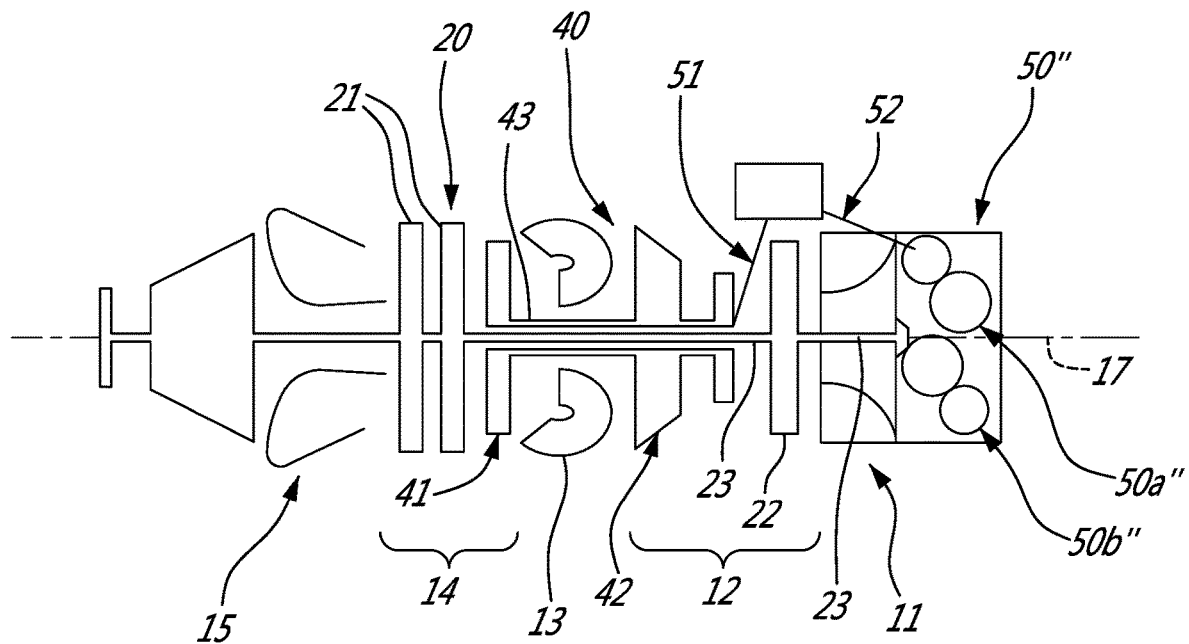
FIG. 5 is a schematic cross-sectional view of a gas turbine engine having an AGB including a dual gear train with a first drive input from the high pressure (HP) spool and a second drive input from the low pressure (LP) spool centrally through the LP compressor.
Figure 6:
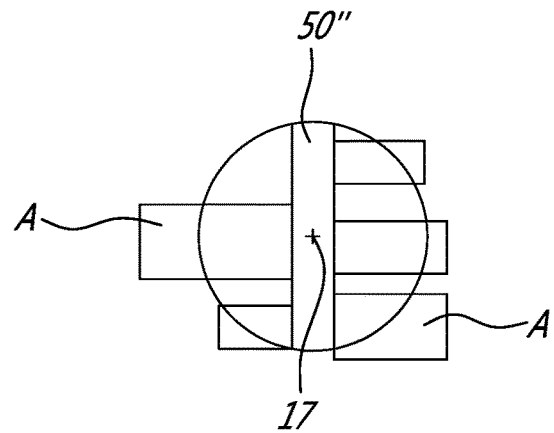
FIG. 6 is a schematic cross-sectional view of the engine shown in FIG. 5 and illustrating sided-mounted accessories projecting from both sides of the AGB.

As shown in FIGS. 5 and 6, the AGB 50" may have more than one drive input. For instance, in addition to the drive input provided by the HP spool 40 via the tower shaft 51 and the AGB drive shaft 52, the power or LP shaft 23 could be extended aft of the LP compressor 22 to provide a second drive input to the AGB 50", thereby providing a secondary drive input to the AGB along the engine axis 17. The provision of a second driving source for the AGB allows reducing the load on the HP spool 40. Indeed, the load required to drive the AGB could be shared by both the LP and the HP spools 20, 40. The HP spool 40 and the LP spool 20 can be used to jointly drive a single gear train or to provide independent drive to individual gear trains of a multi-gear train arrangement.

For instance, according to the embodiment shown in FIGS. 5 and 6, the AGB 50" is a dual gear train comprising first and second gear trains 50a" and 50b". The first gear train 50a" is drivingly connected to the HP spool 40 via tower shaft 51 and the AGB input shaft 52. The second gear train 50b" is drivingly connected to the LP spool 20 via the LP shaft 23. The first and second gear trains 50a" and 50b" can be respectively drivingly connected to first and second groups of accessories A. For instance, the first gear train 50a", which is driven by the HP spool 40, may be drivingly connected to the main accessories, such as the starter, the fuel control unit, and the oil pump. The second gear train 50b", which is driven by the LP spool 20, may be drivingly connected to secondary accessories, such as an air vacuum pump and an electric generator. The first and second gear trains 50a", 50b" are provided with an output connection for the associated accessories.

As shown in FIG. 6, the accessories can be side-mounted to the AGB 50" as described herein above with respect to FIGS. 1 and 2. However, the accessories could also be axially mounted as shown in FIGS. 3 and 4. Alternatively, some of the accessories A could be side-mounted while others are axially mounted. Various accessories mounting combinations are contemplated irrespective of the AGB configuration (single gear train or dual gear train).

The accessories could also be selectively driven by one or both of the HP and LP spools 40, 20. A clutch or the like could be provided to effectively drivingly connect the LP spool 20 and the HP spool 40 to the AGB 50 or 50". Also, accessories could be driven by the HP offset drive shaft arrangement only or some could be driven by either the HP or LP spools 40, 20.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A turboprop or turboshaft engine comprising: an output drive shaft having a front end configurable to drivingly engage a rotatable load; a low pressure (LP) spool and a high pressure (HP) spool rotatable independently of one another about a central axis, the LP spool having an LP compressor and an LP turbine, the LP turbine drivingly engaged to the output drive shaft via a reduction gear box (RGB), the HP spool having an HP turbine and an HP compressor; the turboprop or turboshaft engine further comprising an accessory gear box (AGB) and a tower shaft drivingly connecting the AGB to the HP spool, the AGB is disposed on the turboprop or turboshaft engine so that the central axis extends through the AGB, wherein the LP compressor is axially positioned between the HP compressor and the AGB.

2. The turboprop or turboshaft engine defined in claim 1, wherein the LP compressor is disposed forward of an air inlet along a direction of travel of the turboprop or turboshaft engine and in fluid communication with the air inlet, the AGB being disposed aft of the air inlet.

3. The turboprop or turboshaft engine defined in claim 2, wherein the LP turbine is disposed forward of the LP compressor, the HP compressor is disposed forward of the LP compressor and in fluid communication therewith to receive pressurized air therefrom, the HP turbine is disposed forward of the HP compressor, the HP turbine is disposed aft of the LP turbine and in fluid communication therewith; and wherein the output drive shaft extends forwardly therefrom the LP turbine, the output drive shaft configurable to drivingly engage the rotatable load disposed forward of the LP turbine.

4. The turboprop or turboshaft engine as defined in claim 1, wherein the AGB has a drive shaft having a first end mechanically coupled to the tower shaft and a second end mechanically coupled to the AGB.

5. The turboprop or turboshaft engine defined in claim 1, wherein the AGB is mounted in-line to an axially facing surface of a casing of the turboprop or turboshaft engine.

6. The turboprop or turboshaft engine defined in claim 5, wherein the AGB is centered relative to the central axis of the turboprop or turboshaft engine.

7. The turboprop or turboshaft engine defined in claim 1, further comprising at least one accessory side-mounted to the AGB, the at least one accessory having an input axis which is non-parallel to the central axis.

8. The turboprop or turboshaft engine defined in claim 7, wherein the input axis of the at least one accessory is transversal to the central axis.

9. The turboprop or turboshaft engine defined in claim 1, wherein the LP and the HP spools are both drivingly connected to the AGB.

10. The turboprop or turboshaft engine defined in claim 1, wherein the AGB comprises first and second gear trains, the first gear train having a first drive input, the second gear train having a second drive input, the first drive input being drivingly connected to the tower shaft, the second drive input being drivingly connected to the LP spool.

11. The turboprop or turboshaft engine defined in claim 10, further comprising first and second groups of accessories, the first and second gear trains being respectively drivingly connected to the first and second groups of accessories.

12. The turboprop or turboshaft engine defined in claim 11, wherein the first group of accessories comprises at least one of: a starter, a fuel control unit and an oil pump; and wherein the second group of accessories comprises at least one of: an air vacuum pump and an electric generator.

13. A reverse flow gas turbine engine comprising:
an output drive shaft having a front end configurable to drivingly engage a rotatable load;
a low pressure (LP) spool rotatable about an engine axis and including an LP turbine drivingly engaged to the output drive shaft, and an LP compressor drivingly connected to the LP turbine, the LP turbine disposed forward of the LP compressor relative to a front end of the output drive shaft; and
a high pressure (HP) spool rotatable about the engine axis independently of the LP spool, the HP spool including an HP turbine and an HP compressor drivingly engaged to an HP shaft, the HP compressor disposed forward of the LP compressor and in fluid communication therewith, and the HP turbine disposed aft of the LP turbine and in fluid communication therewith;
a tower shaft mechanically coupled to the HP spool;
an accessory gearbox (AGB) disposed aft of the LP compressor, the engine axis extending through the AGB; and
an AGB drive shaft having a first end mechanically coupled to the tower shaft and a second end mechanically coupled to the AGB;
wherein the LP spool has an LP compressor shaft extending along the engine axis aft of the LP compressor, the LP compressor shaft in driving engagement with the AGB.

14. The reverse flow gas turbine engine defined in claim 13, wherein the AGB is centered relative to the engine axis.

15. The reverse flow gas turbine engine defined in claim 13, further comprising at least one accessory side-mounted to the AGB.

16. The reverse flow gas turbine engine defined in claim 15, wherein the at least one accessory has an input axis oriented transversally to the engine axis.

17. The reverse flow gas turbine engine defined in claim 13, wherein the AGB comprises first and second gear trains, the first gear train having a first drive input, the second gear train having a second drive input, the first drive input being drivingly connected to the tower shaft, the second drive input being drivingly connected to the LP compressor shaft.

18. The reverse flow gas turbine engine defined in claim 17, further comprising first and second groups of accessories, the first and second gear trains being respectively drivingly connected to the first and second groups of accessories.

19. A multi-spool gas turbine engine comprising: a low pressure (LP) spool;
a high pressure (HP) spool, the LP spool and the HP spool being independently rotatable about a central axis, the LP pressure spool comprising an LP compressor and an LP turbine, the HP spool comprising an HP turbine and an HP compressor; and an accessory gear box (AGB), the central axis extending through the AGB and the LP compressor being axially positioned between the HP compressor and the AGB, the AGB comprising first and second gear trains, the first gear train having a first drive input, the second gear train having a second drive input, the first and second drive inputs being respectively drivingly connected to the HP and LP spools, wherein the LP spool has an LP compressor shaft extending along the central axis aft of the LP compressor, the LP compressor shaft in driving engagement with the second drive input of the AGB.

20. The multi spool gas turbine engine defined in claim 19, wherein a tower shaft drivingly connects the HP spool to the first drive input of the first gear train, the tower shaft extending from the HP spool in a direction away from the central axis.

21. The multi spool gas turbine engine defined in claim 20, wherein the tower shaft is drivingly connected to an AGB drive shaft, the AGB drive shaft having an axial component parallel to the central axis.

22. The multi spool gas turbine engine defined in claim 21, wherein the second drive input is coaxial to the central axis.

23. The multi-spool gas turbine engine defined in claim 19, further comprising first and second groups of accessories, the first and second gear trains being respectively drivingly connected to the first and second groups of accessories.

24. The multi-spool gas turbine engine defined in claim 19, wherein the first group of accessories comprises at least one of: a starter, a fuel control unit and an oil pump; and wherein the second group of accessories comprises at least one of: an air vacuum pump and an electric generator.

25. A multi-spool gas turbine engine comprising: a low pressure (LP) spool;
a high pressure (HP) spool, the LP spool and the HP spool being independently rotatable about a central axis, the LP pressure spool comprising an LP compressor and an LP turbine, the HP spool comprising an HP turbine and an HP compressor; an accessory gear box (AGB) drivingly connected to at least one of the LP spool and the HP spool, the central axis extending through the AGB and the LP compressor being axially positioned between the HP compressor and the AGB; and at least one accessory drivingly connected to the AGB, the at least one accessory being mounted on a side of the AGB and having an input shaft drivingly connected to the AGB and oriented transversally with respect to the central axis, and wherein the AGB has a central drive input coaxial to the central axis.

26. The multi-spool gas turbine engine defined in claim 25, wherein the at least one accessory projects laterally away from the AGB.

27. The multi-spool gas turbine engine defined in claim 25, wherein the central drive input of the AGB is drivingly connected to the LP spool, and wherein the AGB has another drive input drivingly connected to the HP spool.

28. The multi-spool gas turbine engine defined in claim 27, wherein the HP spool is drivingly connected to the other drive input via a tower shaft, and wherein the LP spool is drivingly connected to the central drive input centrally through the LP compressor, the LP spool having an LP compressor shaft extending along the central axis to a location aft of the LP compressor for driving engagement with the central drive input of the AGB.

29. The multi-spool gas turbine engine defined in claim 27, wherein the at least one accessory comprises a first accessory and a second accessory, and wherein the first accessory and the second accessory are respectively drivingly connected to the central drive input and the other drive input.

\* \* \* \* \*